United States Patent
Munk-Hansen et al.

(10) Patent No.: US 8,461,452 B2
(45) Date of Patent: Jun. 11, 2013

(54) ARRANGEMENT FOR DIRECTING A LIGHTNING CURRENT WITHIN A WIND TURBINE

(75) Inventors: Thorkil Munk-Hansen, Give (DK); Rune Nielsen, Ikast (DK)

(73) Assignee: Siemens Aktiengesellschaft, München (KR)

( * ) Notice: Subject to any disclaimer, the term of this patent is extended or adjusted under 35 U.S.C. 154(b) by 180 days.

(21) Appl. No.: 13/043,639

(22) Filed: Mar. 9, 2011

(65) Prior Publication Data

US 2011/0232934 A1    Sep. 29, 2011

(30) Foreign Application Priority Data

Mar. 26, 2010  (EP) ..................................... 10157977

(51) Int. Cl.
*H02G 13/00*    (2006.01)

(52) U.S. Cl.
USPC ........................ 174/2; 174/3; 174/5 R; 439/98

(58) Field of Classification Search
USPC .......................... 174/2, 3, 5 R; 439/98; 416/31
See application file for complete search history.

(56) References Cited

U.S. PATENT DOCUMENTS

| | | | |
|---|---|---|---|
| 7,915,525 B2 * | 3/2011 | Canham | 174/2 |
| 8,215,911 B2 * | 7/2012 | Grabau | 416/146 R |
| 8,232,472 B1 * | 7/2012 | Bean et al. | 174/2 |
| 2003/0170122 A1 | 9/2003 | Wobben | |

FOREIGN PATENT DOCUMENTS

| | | |
|---|---|---|
| EP | 1154537 A2 | 11/2001 |
| EP | 1568883 A2 | 8/2005 |
| WO | WO 2005050008 A1 | 6/2005 |

* cited by examiner

*Primary Examiner* — Dhirubhai R Patel

(57) ABSTRACT

The present invention relates to an arrangement for directing a lightning current within a wind turbine. The arrangement includes a first component, a second component, a contact element and a guideway. One of the two components is arranged moveably in relation to the other. The contact element is arranged in a way that the first component is electrically connected to the second component in order to direct a lightning current within the wind turbine. The contact element is guided moveably by the guideway. According to the invention, the guideway is at least partly integrated in the first component.

11 Claims, 4 Drawing Sheets

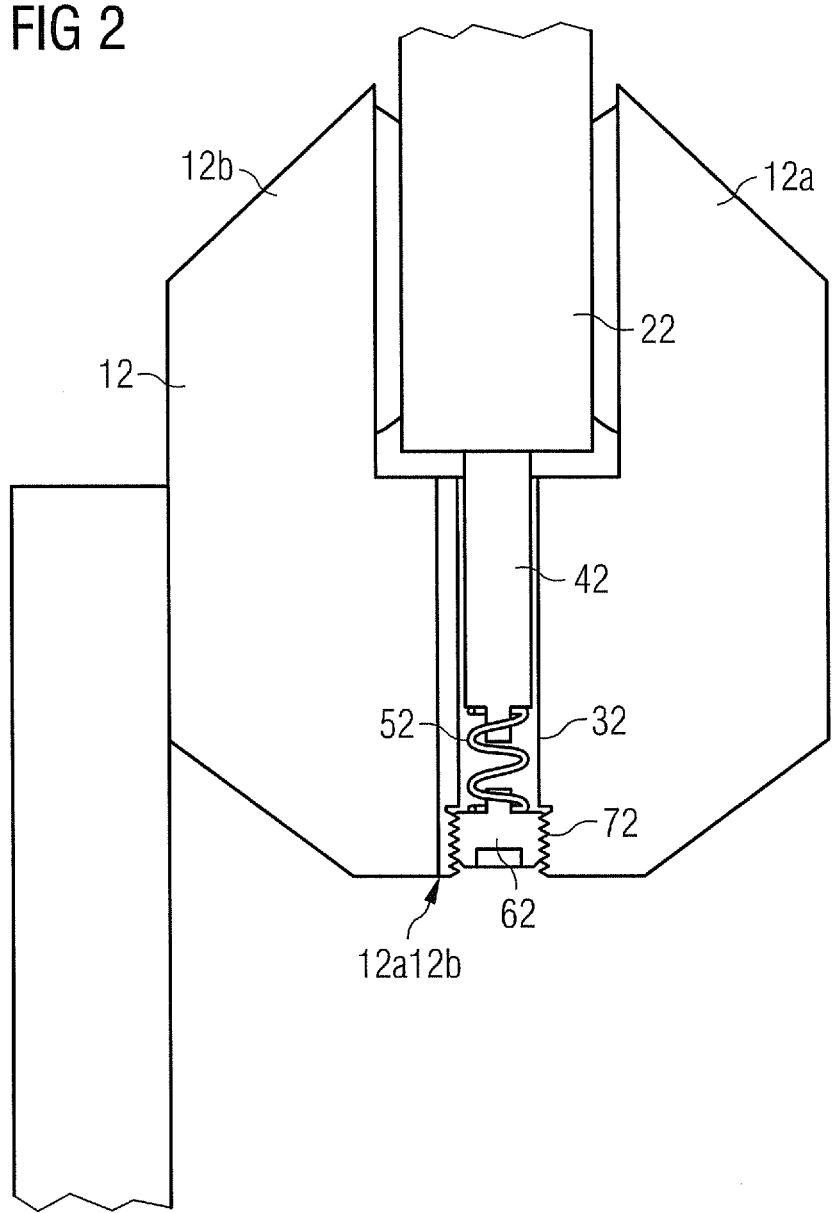

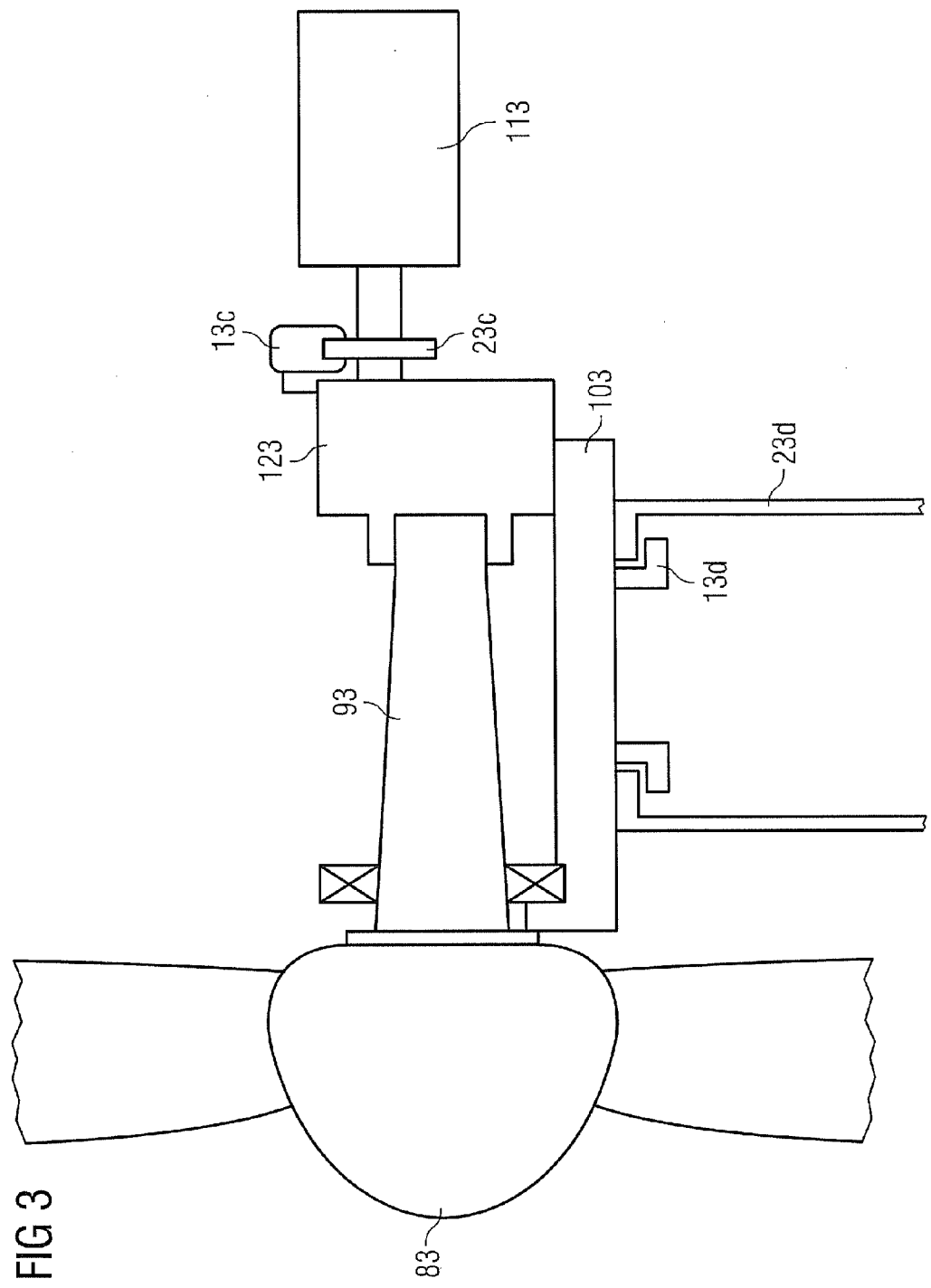

ARRANGEMENT FOR DIRECTING A LIGHTNING CURRENT WITHIN A WIND TURBINE

CROSS REFERENCE TO RELATED APPLICATIONS

This application claims priority of European Patent Office application No. 10157977.9 EP filed Mar. 26, 2010, which is incorporated by reference herein in its entirety.

FIELD OF INVENTION

The present invention relates to an arrangement for directing a lightning current within a wind turbine and to a wind turbine comprising this arrangement.

BACKGROUND OF INVENTION

Wind turbines are located in areas that are unprotected from meteorological conditions in order to tap the full potential of the wind.

Due to this siting in exposed areas and due to the shape of wind turbines, there is a high probability of lightning strokes which may cause severe damage. For this reason, wind turbines are equipped with lightning protection systems for protecting their components against lightning impacts.

As shown in the simplified schematical figure FIG. 3, wind turbines, generally, comprise a tower 23d, a nacelle and a rotor system 83.

The bed frame 103 of the nacelle is connected to the tower 23d via a yaw system for enabling movement of the nacelle on top of the tower 23d. The bed frame 103 further supports the drive train of the wind turbine which is installed inside of the nacelle.

The rotor system 83, comprising hub and rotor blades, is connected to the drive train. The drive train itself comprises at least a shaft 93, a generator 113 and a braking system 13c, 23c and may further comprise a gearbox 123. The braking system comprises a brake calliper 13c and a brake disk 23c.

In case of a lightning stroke, significant parts of the lightning current may pass through or near all wind turbine components. Thus, the lightning current has to be directed over an electrically conducting path to ground in such a way that damages to the components are avoided.

Some of the components on this conducting path have to be electrically coupled although they are moveable in relation to each other.

Those interconnections are, beside the hub/nacelle interconnection, also the yaw clamp/tower interconnection 13d, 23d on top of the tower and brake calliper/brake disk interconnections 13c,23c, wherein the brake calliper/brake disk interconnections 13c,23c may be located on the generator shaft or elsewhere in the wind turbine.

In this context, FIG. 4a and FIG. 4b show a prior art realisation of a yaw system comprising a lightning current protection unit for transferring a lightning current from the nacelle 14 to the tower 24 of the wind turbine.

FIG. 4a shows a cross-sectional view and FIG. 4b shows a topview of this realisation.

The realisation comprises basically a block-shaped conductive brush 44, a spring 54 for pressing the brush 44 onto the yaw ring, a wire 144 for connecting electrically the brush 44 to the nacelle 14 and a bracket-shaped lightning brush casing 134 in which the brush 44 and the spring 54 are located.

The parts of the unit are assembled in advance, and then, the entire assembly is mounted with bolts 154 between the yaw clamps 14a, 14b.

SUMMARY OF INVENTION

A drawback of this realisation is the fact that a number of different parts has to be assembled in a confined space.

Another drawback of this realisation is that free space near the components is required to mount the assembly.

In addition, maintenance of the unit is difficult because the casing has to be detached or opened for exchanging parts or performing other maintenance measures.

Moreover, this known arrangement does not function in an efficient way because the lightning current is not conducted the direct way.

Concerning the lightning protection of braking systems of wind turbines, it is known to mount a number of brushes on a static part, which is a kind of brush holder. The brushes are in electrical contact with the static part and form an electrical connection to the brake disk.

Disadvantageously, this known arrangement does not function in an efficient way because the lightning current is not conducted the direct way.

Moreover, this known arrangement is complex because a number of parts have to be mounted.

In addition, a certain space has to be provided for mounting these parts.

Therefore, it is the aim of the present invention to provide an improved arrangement for directing a lightning current within a wind turbine which is space-saving as well as more efficient and less complex than lightning protection arrangements known in the art.

The aim of the invention is achieved by the features of the independent claims.

Further aspects of the invention are subject of the dependent claims.

The present invention relates to an arrangement for directing a lightning current within a wind turbine. The arrangement comprises a first component, a second component, a contact element and a guideway. One of the two components is arranged moveably in relation to the other. The contact element is arranged in a way that the first component is electrically connected to the second component in order to direct a lightning current within the wind turbine. Moreover, the contact element is guided moveably by the guideway. According to the invention, the guideway is at least partly integrated in the first component.

The inventive arrangement has the advantage that it consists of fewer parts and less complex parts compared to known lightning protection arrangements. Thus, the manufacturing and storage costs are reduced.

Moreover, the arrangement as a whole is less complex and can be mounted more easily.

Maintenance of the inventive arrangement is facilitated because the parts can be fitted and replaced in a simple manner.

Even the adjustment of the resilient connection is easily possible.

The inventive arrangement functions efficiently and the risk of failure is reduced because a lightning current is conducted over the shortest path between the components.

In addition, it is no longer necessary to mount a lightning protection arrangement externally of the components. Thus, space is cleared which can be used otherwise, for instance for strenghtening structurally the yaw clamps.

The invention will be described by way of example in more detail in the following.

BRIEF DESCRIPTION OF THE DRAWINGS

The drawings FIG. 1 and FIG. 2 show preferred configurations and do not limit the scope of the invention.

FIG. 1 shows a cross-sectional view of an arrangement according to an embodiment of the invention, FIG. 2 shows a cross-sectional view of an arrangement according to another embodiment of the invention, FIG. 3 shows a schematic representation of the basic components of a wind turbine as described above.

DETAILED DESCRIPTION OF INVENTION

Figure 1:
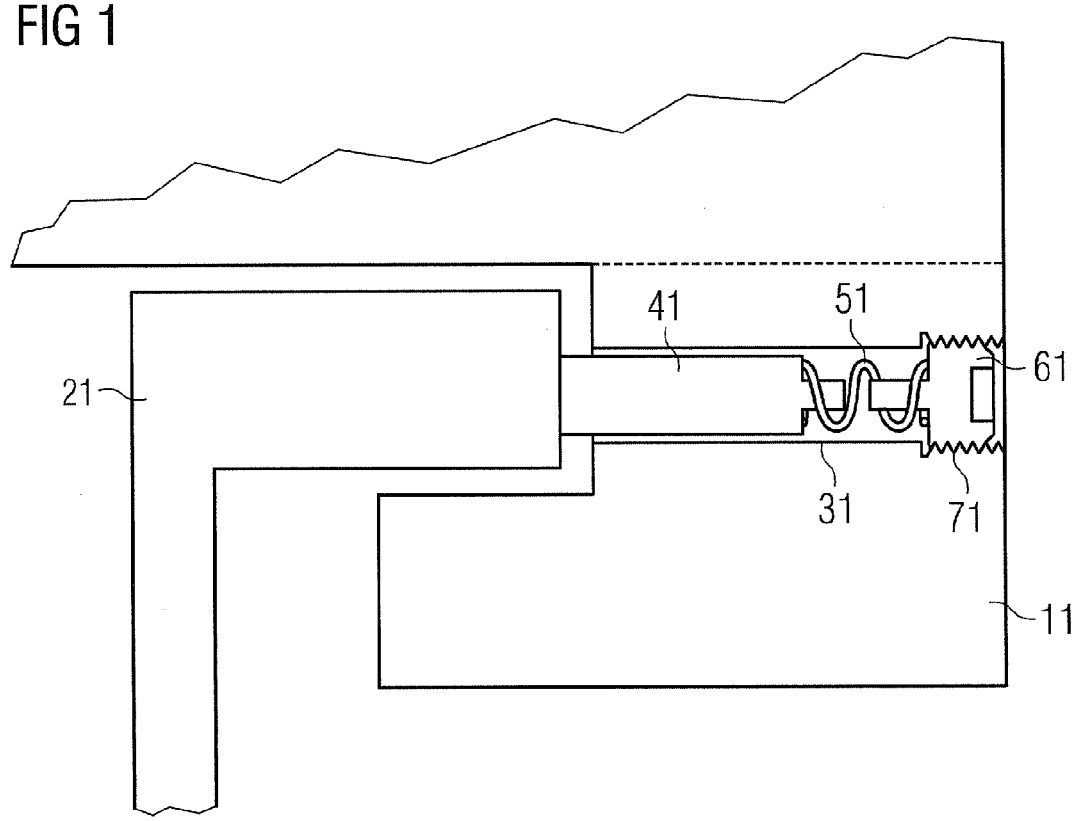
Figure 4A:
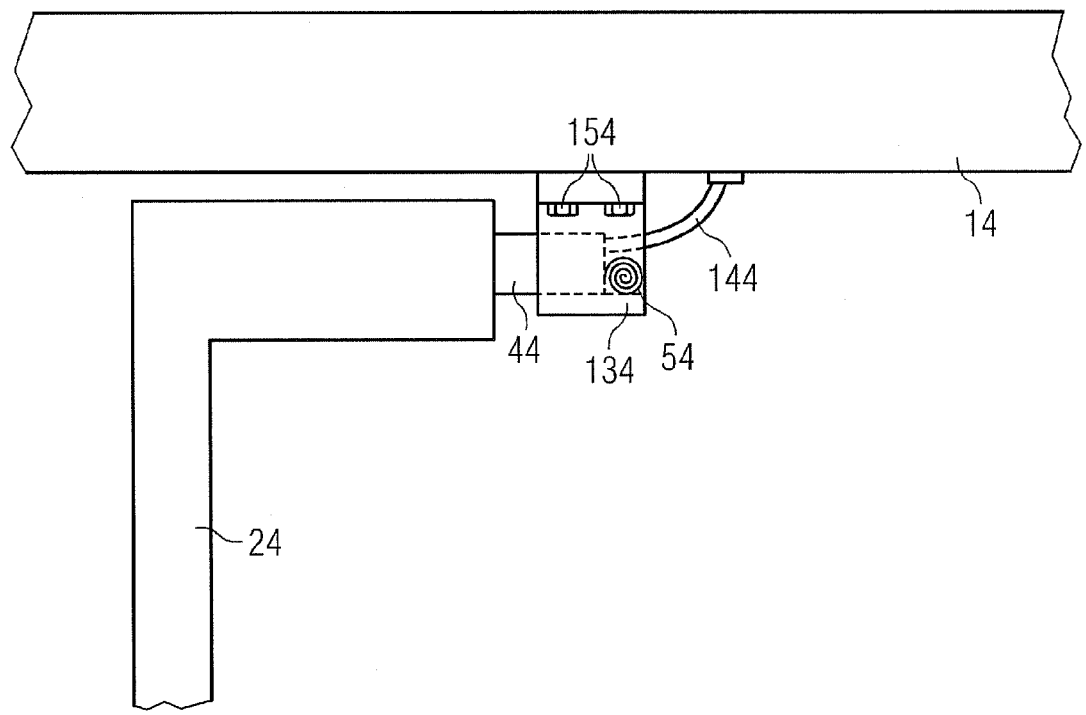
FIG. 4a and FIG. 4b show the prior art as described above.
Figure 4B:
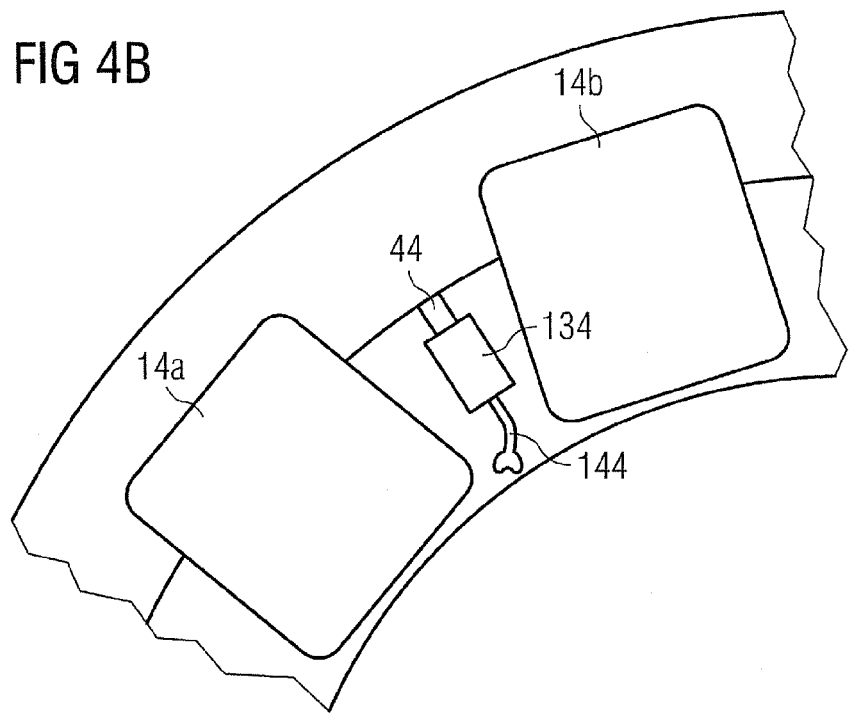

FIG. 1 illustrates a first embodiment. It shows a cross-sectional view of a part of a wind turbine comprising a first component, namely a yaw clamp 11 and a second component, namely a tower 21.

The yaw clamp 11 forms part of a yaw system which is mounted between the nacelle and the tower 21. The nacelle and the yaw clamp 11 are able to move on top of the tower 21.

In order to achieve a lightning protection effect, a contact element 41 is installed between the yaw clamp 11 and the tower 21.

The contact element 41 is mounted at least partly integrated in the yaw clamp 11 in radial direction. For this reason, a guideway 31 is provided in the yaw clamp 11. This guideway 31 is realised in form of a recess, for instance a radial hole. Alternatively, the guideway 31 may be constructed as a channel or as a groove.

A first end of this contact element 41 is pressed onto the tower 21 to form a sliding contact. The contact element 41 is either resilient by itself or mounted resiliently. The first end of the contact element 41 may be pressed directly onto the surface of the tower 21 or onto a sliding element attached to the tower 21. A second end of the contact element 41 is connected to the yaw clamp 11.

According to an embodiment of the invention the contact element 41 comprises a conductive rod. The conductive rod 41 is made of a material which is able to conduct and support a lightning current within a wind turbine like carbon, graphite, metal or a composite material comprising one or more of these materials.

In a preferred embodiment of the invention, the rod is made of a graphite-copper composite material. Advantages of this material are a good conductivity and a low wear rate. An alternative material that could be used instead is a silver-graphite composite material. This material has an even better conductivity than a copper-graphite composite.

The conductive rod 41 comprises a first end and a second end. According to another embodiment of the invention, the required pressing force of the conductive rod 41 is achieved by mounting an electrically conducting spring 51 tensely between the second end of the rod 41 and the yaw clamp 11. Thus, a constant pressing force of the rod 41 is ensured in spite of wearing of the rod 41 over the time and unevennesses of the sliding surface of the tower 21 are compensated. Of course, different types of springs can be used.

The rod 41 is connected via the spring 51 to the yaw clamp 11 in a firm but detachable manner.

According to a further embodiment of the invention, this firm but detachable connection is achieved by a screw connection 61 at the outer end of the guideway 31.

In yet a further embodiment of the invention, this connection is realised by mounting a grub screw 61 in the guideway 31 which engages with a threading 71 provided at the outer end of the guideway 31. This allows for easily changing the rod 41 or the spring 51 and it also allows for adjusting the spring force in a simple way by turning the grub screw 61. Thus, maintenance of the arrangement is facilitated.

FIG. 2 illustrates a second embodiment. It shows a cross-sectional view of a part of a braking system of the wind turbine comprising a first component, namely a double acting brake calliper 12, within which a first component, namely a brake disc 22, is arranged. The brake calliper 12 comprises a first calliper half 12a and a second calliper half 12b.

In order to achieve a lightning protection effect, a contact element 42 is arranged between the brake calliper 12 and the brake disc 22.

The contact element 42 is mounted at least partly integrated in the brake calliper 12. For this reason, a guideway 32 is provided in the brake calliper 12. This guideway 32 is realised in form of a recess, for instance a radial hole. Alternatively, the guideway 32 may be constructed as a channel or as a groove.

In an embodiment of the invention, shown in FIG. 2, the guideway 32 is provided near the calliper set divide 12a12b.

As aforementioned, the brake calliper 12 comprises a first calliper half 12a and a second calliper half 12b. As shown in FIG. 2, the guideway 32 is arranged in the first calliper half 12a.

A first end of the contact element 42 is pressed onto the brake disk 22 to faun a sliding contact. The contact element 42 is either resilient by itself or mounted resiliently. The contact element 42 may be pressed directly onto the surface of the brake disk 22 or onto a sliding element attached to this brake disk 22.

The second end of the contact element 42 is connected to the first calliper half 12a.

According to an embodiment of the invention, the contact element 42 comprises a conductive rod. The conductive rod 42 is made of a material which is able to conduct and support a lightning current within a wind turbine like carbon, graphite, metal or a composite material comprising one or more of these materials.

In a preferred embodiment, the rod is made of a graphite-copper composite material. Advantages of this material are a good conductivity and a low wear rate. An alternative material that could be used instead is a silver-graphite composite material. This material has an even better conductivity than a copper-graphite composite.

The conductive rod 42 comprises a first end and a second end. According to an embodiment of the invention, the required pressing force of the rod 42 is achieved by mounting a conductive spring 52 tensely between the second end of the rod 42 and the first calliper half 12a. Thus, a constant pressing force of the rod 42 is ensured in spite of wearing of the rod 42 over the time, and unevennesses of the sliding surface of the brake disk 22 are compensated. Of course, different types of springs 52 can be used.

The rod is connected via the spring 52 to the first calliper half 12a in a firm but detachable manner. According to an embodiment of the invention, this firm but detachable connection is achieved by a screw connection 62 at the outer end of the guideway 32.

In a preferred embodiment of the invention, this connection is realised by mounting a grub screw 62 in the guideway 32 which engages with a threading 72 provided at the outer end of the guideway 32. This allows for easily changing the rod 42 or the spring 52. It also allows for adjusting the spring force in a simple way by turning the grub screw 62. Thus, maintenance of the arrangement is facilitated.

In another embodiment of the invention, additional guideways 32 and contact elements 42 may be arranged in the brake calliper 12 in the first 12a and/or in the second half 12b.

In yet another embodiment of the invention, the above described braking system is located on the shaft near the generator and is used for securing the shaft, for instance for maintenance purposes. As a matter of course, the braking system may also be installed elsewhere in the wind turbine.

The wind turbine can comprise an arrangement according to the invention either in a calliper brake or in one or more yaw clamps; and it can, of course, comprise such an arrangement in one or more calliper brakes as well as in at least one yaw clamp.

It becomes clear to a person skilled in the art that the arrangement, according to the invention, can also be used to conduct a lightning current between other electrical conductive components in a wind turbine, in particular for directing a lightning current from a hub to a nacelle.

The invention claimed is:

1. An arrangement for directing a lightning current within a wind turbine, comprising:
   a first component and a second component, one of the two components is arranged moveably in relation to the other;
   a guideway at least partly integrated in the first component;
   a contact element arranged to electrically connect the first component to the second component in order to direct a lightning current within the wind turbine;
   wherein the contact element has a first end and a second end;
   wherein the first end is pressed onto the second component to form a sliding contact;
   wherein the contact element is guided moveably by the guideway, and
   wherein the second end is connected to a fastening element of the first component via a current conducting spring element.

2. The arrangement according to claim 1, wherein the guideway is constructed as a recess.

3. The arrangement according to claim 1, wherein the guideway is constructed as a channel.

4. The arrangement according to claim 1, wherein the guideway is constructed as a groove.

5. The arrangement according to claim 1, wherein the fastening element a screw connection to connect the fastening element to the first component in a firm but detachable manner.

6. The arrangement according to claim 1, wherein the contact element comprises a rod which is arranged in a moveable manner at least partly within the guideway.

7. The arrangement according to claim 1, wherein the contact element is made of a material comprising carbon and/or graphite and/or copper and/or silver.

8. The arrangement according to claim 1, wherein the first component is a yaw clamp being connected to the nacelle of a wind turbine and the second component is a part of the tower of a wind turbine.

9. The arrangement according to claim 1, wherein the first component is a brake calliper and the second component is a brake disk forming together a braking system of a wind turbine.

10. The arrangement according to claim 9, wherein the brake calliper comprises two parts while the guideway is arranged in at least one of these parts.

11. A wind turbine comprising:
    an arrangement according to claim 1.

* * * * *